(12) United States Patent
Lin et al.

(10) Patent No.: US 6,838,065 B2
(45) Date of Patent: Jan. 4, 2005

(54) METHOD AND APPARATUS FOR TREATING WASTE GAS CONTAINING PFC AND/OR HFC

(75) Inventors: Shu-Sung Lin, Taipei (TW);
Bao-chang Lin, Taipei (TW);
Hsin-Hsien Wu, Yunlin (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/425,601

(22) Filed: Apr. 30, 2003

(65) Prior Publication Data

US 2004/0146442 A1 Jul. 29, 2004

(30) Foreign Application Priority Data

Jan. 28, 2003 (TW) ........................................ 92101790 A

(51) Int. Cl.$^7$ ................................................. A62D 3/00
(52) U.S. Cl. ............................. 423/240 S; 423/245.3; 588/206; 588/248
(58) Field of Search ........................ 423/240 S, 240 R, 423/245.3; 588/248, 206, 213

(56) References Cited

U.S. PATENT DOCUMENTS

| 5,145,657 A | * | 9/1992 | Kobayashi et al. | .......... | 423/219 |
| 5,609,736 A | * | 3/1997 | Yamamoto | .................. | 204/164 |
| 6,673,326 B1 | * | 1/2004 | Rossin et al. | ............ | 423/240 S |

* cited by examiner

*Primary Examiner*—Stanley S. Silverman
*Assistant Examiner*—Edward M. Johnson
(74) *Attorney, Agent, or Firm*—Birch, Stewart, Kolasch & Birch, LLP

(57) ABSTRACT

A method for treating waste gas containing PFC and/or HFC, comprising contacting a mixture of gas waste containing PFC and/or HFC, ozone, and water with an iron oxide catalyst at a temperature between 50 and 300° C. by gas-solid contact to perform an oxidation reaction for reducing the amount of PFC and/or HFC. An apparatus for treating waste gas containing PFC or HFC is also provided. The operational temperature in the present invention is much lower than the prior art, and thus provides lower energy consumption and little risk of fire. The present invention is suitable for the treatment of waste gas containing PFC and/or HFC, especially for the removal of perfluorocompounds from the waste gas generated by semiconductor and photoelectrical product manufacturing plants.

13 Claims, 2 Drawing Sheets

METHOD AND APPARATUS FOR TREATING WASTE GAS CONTAINING PFC AND/OR HFC

BACKGROUND OF THE INVENTION

1. Field of the Invention

The present invention relates to a method and apparatus for treating waste gas and in particular to a method and apparatus for treating waste gas containing PFC and/or HFC.

2. Description of the Related Art

In perfluorinated compound (PFC) waste reduction technology, process modification, such as promoting the utilization efficiencies of perfluorinated compounds in the process and using substitutes for perfluorinated compounds, recover and reuse, and end-of-pipe treatment are commonly used. Although end-of-pipe treatment is not the best choice for waste reduction, it is the most mature, economical, and efficient way to reduce perfluorinated compounds and/or hydrofluorocarbons (HFCs). Among the various end-of-pipe treatment methods, the combustion-based decomposition process is a well-developed PFC treatment technology, which uses a combustion temperature higher than 1200° C. The catalytic combustion-based decomposition process treats PFCs with catalysts at a relatively low temperature between about 500° C. and 750° C. The plasma-based process utilizes a localized, relatively high temperature to treat PFC and the central temperature may exceed than 3000° C. These methods consume an excessive amount of energy and pose a high risk of fire.

U.S. patent application Ser. No. 20020150527 and WO 01/21304 A1 disclose a catalyst composition and a treatment method wherein PFC and HFC are decomposed using the catalyst composition. The catalyst composition includes aluminum oxide preferably stabilized by the addition of, for example, titanium, zirconium, cobalt, compounds thereof, or mixtures thereof. The operating temperature must be higher than 300° C., and preferably from about 500° C. to 800° C., without the use of ozone and iron oxide.

Among transitional metal oxides, ferric oxide has moderate oxidation reactivity respective to $H_2$, CO, $CH_4$, and paraffin. The examples of transitional metal oxides as catalysts are mainly seen in applications for oxidation, hydrogenation, or dehydrogenation. Ferric oxide is commonly used as a catalyst in, for example, high temperature conversion reaction, synthesis reaction of polystyrene from styrene, ammonia synthesis reaction, and reaction for removal of hydrogen sulfide.

Ozone is a very strong oxidant and widely used in water treatment, organic synthesis, and food sanitizing. Upon the decomposition of the pollutant by ozone, the ozone is immediately reduced to molecular oxygen without generating residue or causing secondary pollution.

Nevertheless, iron oxide and ozone have never been used in combination for treating PFCs and HFCs.

In view of the United Nations Framework Convention on Climate Change and Kyoto Protocol, and the parties agreeing to the Protocol, the emissions of greenhouse gas (including PFCs and HFCs) are to be further restricted between 2008 and 2012 to protect the environment. Hence, there is a need for a better method and apparatus for treating waste gas containing PFC and/or HFC.

SUMMARY OF THE INVENTION

Accordingly, to resolve the problems of excessive energy consumption and the high risk of fire posed by the conventional methods mentioned above, an object of the invention is to provide a method and apparatus for treating waste gas containing PFC and/or HFC.

In order to achieve the above object, the invention provides a method for treating waste gas containing PFC and/or HFC, which comprises the step of contacting a mixture of the waste gas containing PFC and/or HFC, ozone, and water with an iron oxide catalyst to undergo gas-solid contact and oxidation reaction at a temperature between 50° C. and 300° C. to reduce the amount of PFC and/or HFC.

The invention further provides a method for treating waste gas containing PFC and/or HFC, which comprises the steps of (i) heating the waste gas containing PFC and/or HFC in a concentration of 100 to 50000 ppmv, and water in a concentration of 1 to 1000 ppmv, at a temperature between 50° C. and 300° C., (ii) introducing ozone in a concentration of 100 to 50000 ppmv, to the resultants from the step (i) and mixing to form a uniform mixture, and (iii) subjecting the mixture of the waste gas containing PFC and/or HFC, ozone, and water and an iron oxide catalyst to gas-solid contact and oxidation reaction at a temperature between 50° C. and 300° C. for 1.0 to 10 seconds retention time to reduce the amount of PFC and/or HFC.

The invention also provides an apparatus for treating waste gas containing PFC and/or HFC, which comprises a heating device for heating incoming waste gas containing PFC and/or HFC and water at a temperature between about 50 and 300° C., an ozone generator for generating ozone, a mixing device for receiving and uniformly mixing the ozone from the ozone generator and the waste gas containing PFC and/or HFC and the water from the heating device to form a gas mixture, and a reactor for receiving the gas mixture from the mixing device, wherein, the reactor contains an iron oxidation catalyst and the gas mixture and the iron oxidation catalyst are subjected to gas-solid contact and oxidation reaction at a temperature between about 50 and 300° C.

Waste gas containing PFC and/or HFC can be treated efficiently using the present method and apparatus, especially, when HFC and/or HFC are used as raw material in the semiconductor industry or photoelectrical industry. Among these compounds, the treatment of $C_2F_6$ is the most difficult, but can be easily accomplished in the present invention. Furthermore, in the present invention, PFC and/or HFC react with ozone and the catalyst at a controlled temperature less than about 300° C., thus eliminating the problems of secondary pollution caused by exhausted ozone-containing gas, excessive energy consumption, and high risk of fire.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
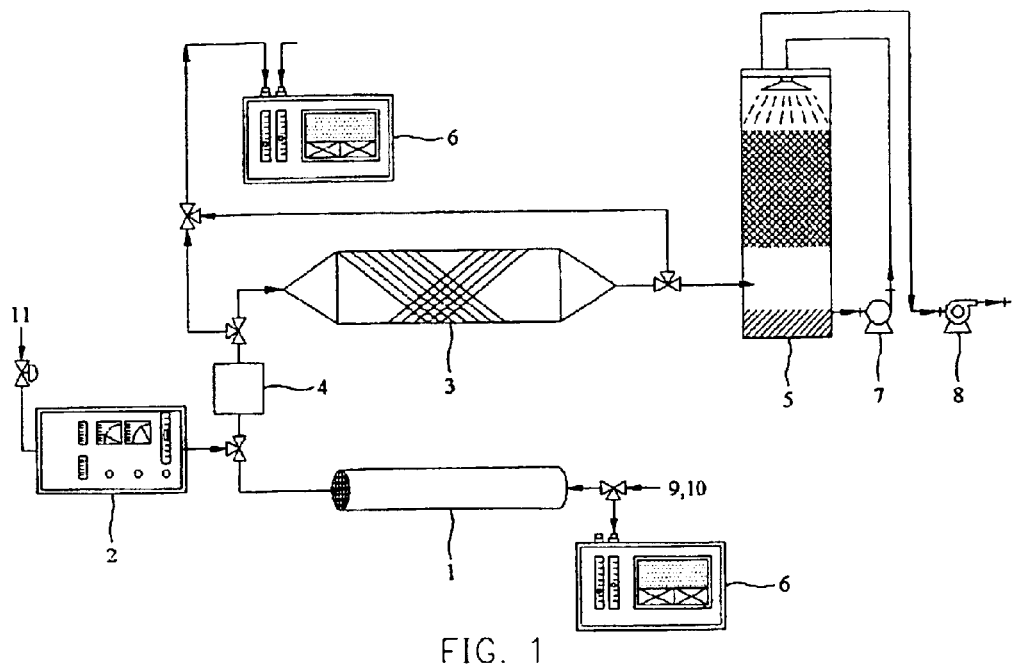
FIG. 1 is an illustration of an example of the apparatus for treating waste gas containing PFC and/or HFC of the present invention.

The present invention is now described in detail with reference to FIG. 1.

In the present method for treating waste gas containing PFC and/or HFC, waste gas containing PFC and/or HFC 9 and moisture 10 are heated through a heating device 1. The resulting gas mixture is controlled at a temperature between about 50 and 300° C., but not higher than the 500° C. used in the conventional perfluorinated compound treatment technology, thus greatly reducing energy consumption. The ozone (not shown in FIG. 1) generated by the ozone generator 2 and the waste gas containing PFC and/or HFC 9 and moisture 10 from the heating device 1 are introduced into a mixing device 4, and sufficiently stirred and mixed. Alternatively, the introduction site of ozone may be prior to the heating device.

Examples of PFCs to be treated using the present method are $CF_4$, $C_2F_6$, $C_3F_8$, $NF_3$, $SF_6$, and a combination thereof. An example of HFC is $CHF_3$. The loading of the waste gas for treatment may be 100 to 50000 ppmv, and preferably 1000 to 10000 ppmv.

The concentration of incoming moisture 10 (that is, water) may be 1 to 1000 ppmv, and preferably 200 to 500 ppmv.

The concentration of incoming ozone may be 100 to 50000 ppmv, and preferably 1000 to 10000 ppmv.

The mixed waste gas containing PFC and/or HFC 9, ozone, and moisture 10 are introduced into a reactor 3 to undergo gas-solid contact and oxidation reaction with a catalyst in the reactor 3 at a temperature kept between 50 and 300° C., and preferably between 100 and 200° C. The catalyst bed may be vertical or horizontal. Suitable catalysts are iron oxides, including ferric oxide, ferric oxide monohydrate, ferriferrous oxide, ferriferrous oxide monohydrate and a combination thereof, preferably ferric oxide monohydrate, and specifically, needle shaped ferric oxide monohydrate which is also known as goethite (FeOOH).

The retention time for waste gas in the catalyst bed may be 0.1 to 10 seconds. It may be more than 10 seconds, but because of economic considerations, a shorter amount of time is preferred. The ratio of the concentrations of PFC and/or HFC to ozone is 0.1 to 10 ppmv/ppmv. The humidity at the site before the inlet of the reactor 3 is controlled to remain between 20% and 100%. The humidity herein is relative humidity and came from the process.

After the above-mentioned waste gas containing PFC and/or HFC 9 to be treated is subjected to contact and oxidation reaction with the catalyst in the reactor 3, the perfluorinated compounds and/or the hydrofluorocarbons contained in the waste gas can be decomposed into $CO_2$, $H_2O$, and inorganic acids which are dischargeable. Preferably, a scrubbing tower 5 with a scrubbing solution is further installed for removing the inorganic acids produced by the treatment before discharge.

Optionally, a windmill 8 can be installed prior to the inlet of the system of the present invention, or after the outlet of the system, providing the function of gas collection.

Optionally, the humidity, temperature, and ozone concentration of the gas stream at the site prior to the heating procedure of waste gas and water or prior to or after the gas-solid contact procedure are detected by a humidity, temperature, and ozone concentration monitor and auto-control device 6. The variations of the collected data are compared and provided for the control of humidity, temperature, ozone concentration, and flow rate of the scrubbing solution (if used), in order to maintain stable, high treatment efficiency of the integral apparatus through the adjustment of these controlling factors, especially in the case of a high concentration or a dramatically varied load of waste gas containing PFC and/or HFC.

The present invention can be directly applied to combustion technology for perfluorinated compound waste gas and the categories and concentration range of the treatable perfluorinated compounds. Additionally, the operation temperature for the present invention is less than 300° C., thus excessive energy consumption and the risk of fire posed by conventional combustion technology are avoided. Furthermore, the present method is a stable treatment for cases where the concentration of PFC is high or the load is varied dramatically. The present invention effectively treats a wide range of PFC concentrations and types.

Referring to FIG. 1, the manufacture of the apparatus for treating waste gas containing PFC and/or HFC of the present invention is described as follows. The material for the devices and conduits are preferably corrosion-resistant and heat-resistant. Because the operation temperature is less than 300° C. in the present invention, the limitation of heat-resistance is less stringent than that in the prior art. The material contacting gasses such as waste gas containing PFC and/or HFC and ozone can be selected from, for example, SS316 stainless steel, ceramics, quartz, and Teflon.

Suitable heating devices are conventional heating devices for receiving and heating the incoming waste gas containing PFC and/or HFC 9 and water 10 at a temperature between 50 and 300° C. The external heating devices are preferred for their convenience as long as the desired temperature is attainable.

Suitable ozone generators are common ozone generators which can generate ozone from the supply of air or oxygen 11, for generating ozone needed in the treatment of waste gas containing PFC and/or HFC 9. The ozone generator 2 can be connected prior to or after the heating device 1.

The mixing device 4 is for receiving and uniformly mixing the ozone and the waste gas containing PFC and/or HFC 9 and moisture 10 from the heating device 1. Suitable mixing devices are preferably those which can stir the gasses to form a uniform gas mixture and have corrosive and heat resistance up to a temperature between 50 and 300° C.

The reactor 3 contains an iron oxide catalyst and receives the gas mixture from the mixing device 4 and hosts gas-solid contact and oxidation reaction. Suitable iron oxides for use as the catalyst are ferric oxide, ferric oxide monohydrate, ferriferrous oxide, ferriferrous oxide monohydrate and a combination thereof, and preferably in particle or powder form. In order to undergo the gas-solid contact and oxidation reaction at a temperature between 50 and 300° C., and preferably between 100 and 200° C., the reactor 3 can be further equipped with a thermostat or a heating device (not shown in FIG. 1). The iron oxide catalyst bed may be vertical or horizontal.

A scrubbing tower 5 may be further connected to the reactor 3 for receiving the gas from the reactor 3 so that the inorganic acids produced from the reactor 3 can be transferred into a scrubbing solution. The scrubbing solution may be a sodium hydroxide solution. The flow rate of the scrubbing solution is controlled by a flow controller 7. After saturation, the scrubbing solution may be discharged to a waste water treatment plant.

Furthermore, a humidity, temperature, and ozone concentration monitor and auto-control device 6 may be installed at the site prior to the inlet of the heating device 1, prior to the inlet of the reactor 3, or after the outlet of the reactor 3, for optimally controlling treatment conditions. Treatable conditions include, for example, humidity, temperature, ozone concentration, PFC concentration, and the flow rate of the scrubbing solution (if used) to obtain an optimal efficiency of treatment.

Optionally, a windmill 8 can be installed prior to the inlet of the system of the present invention, or after the outlet of the system, providing the function of gas collection.

The apparatus of the present invention is suitable for treating waste gas containing PFC and/or HFC as mentioned above. The examples of PFC are $CF_4$, $C_2F_6$, $C_3F_8$, $NF_3$, $SF_6$, and a combination thereof. The example of HFC is $CHF_3$.

EXAMPLE 1

The treatment of waste gas containing PFC or HFC was performed using the apparatus for treating waste gas containing PFC and/or HFC of the present invention as shown in FIG. 1. The waste gas to be treated was hexafluoroethane, the typical perfluorinated compound gas frequently used in semiconductor or photoelectrical manufacturing and also one of the most difficult-to-treat PFCs. The catalyst used was needle-shaped ferric oxide monohydrate (FeOOH). The incoming concentration of hexafluoroethane was maintained at a level of about 4000 to 6000 ppmv. The humidity of gas just prior to the inlet of the reactor was 50%. The temperature was maintained at 100 to 150° C.

Figure 2:
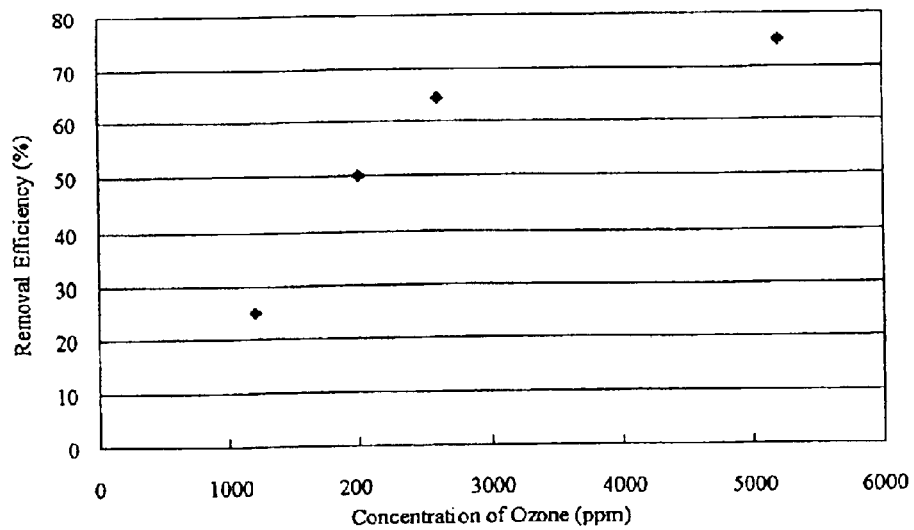
FIG. 2 is a plot showing the removal efficiency versus the temperature of an example of the apparatus for treating waste gas containing PFC and/or HFC of the present invention.

Various concentrations of ozone were used. In the steady state, the retention time for the mixture of hexafluoroethane, ozone, and moisture in the catalyst bed was 0.5 second. The results are shown in Table 1 and FIG. 2.

TABLE 1

Results for using different concentrations of ozone in Example 1

| Ozone conc. (ppmv) | | $C_2F_6$ Conc. (ppmv) | | Removed $C_2F_6$ | |
|---|---|---|---|---|---|
| inlet | outlet | Inlet | outlet | Conc. (ppmv) | Removal efficiency % |
| 2600 | <1 | 4200 | 1500 | 2700 | 64 |
| 2000 | <1 | 4000 | 2000 | 2000 | 50 |
| 1200 | <1 | 4000 | 3000 | 1000 | 25 |
| 5200 | <1 | 6000 | 1500 | 4500 | 83 |

As shown in Table 1, the higher the concentration of ozone relative to the concentration of perfluorinated compound, the better the removal efficiency for the perfluorinated compound. When the concentration of ozone was increased to 5200 ppmv, the removal efficiency for hexafluoroethane was improved to about 83%.

EXAMPLE 2

Figure 3:
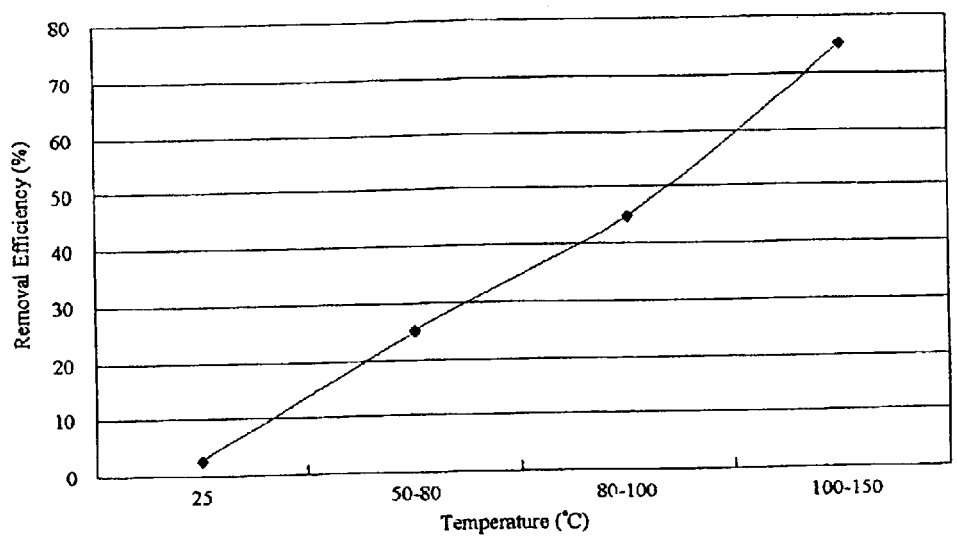
FIG. 3 is a plot showing the removal efficiency versus the concentration of ozone of an example of the apparatus for treating waste gas containing PFC and/or HFC of the present invention.

Example 2 was performed in the same way as Example 1, except that various temperatures were used. The operating conditions in a steady state were as follows. The incoming concentration of hexafluoroethane was maintained at about 4000 ppm to 5000 ppmv, the concentration of ozone was 2600 ppmv, the humidity of gas just prior to the inlet of the reactor was 50%, and the retention time was 0.5 second. The results are shown in Table 2 and FIG. 3.

TABLE 2

Results for using different operation temperatures in Example 2

| Temp. (° C.) | Ozone Conc. (ppmv) | | $C_2F_6$ Conc. (ppmv) | | Removed $C_2F_6$ | |
|---|---|---|---|---|---|---|
| | inlet | outlet | inlet | outlet | Conc. (ppmv) | Removal efficiency % |
| 25 | 2600 | <1 | 4200 | 4100 | 100 | 2 |
| 50–80 | 2600 | <1 | 4000 | 3000 | 1000 | 25 |
| 80–100 | 2600 | <1 | 4000 | 2200 | 1800 | 45 |
| 100–150 | 2600 | <1 | 4000 | 1500 | 3000 | 75 |

As shown in Table 2, when the temperature was 25° C., the removal efficiency for hexafluoroethane was near zero. When the temperature was elevated to 100–150° C., the removal efficiency for hexafluoroethane improved to 75%.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for treating waste gas containing PFC and/or HFC, comprising the step of contacting a mixture of the waste gas containing PFC and/or HFC, ozone, and water with an iron oxide catalyst to undergo gas-solid contact and oxidation reaction at a temperature between 50° C. and 300° C. for 1.0 to 10 seconds retention time to reduce the amount of PFC and/or HFC, wherein the concentration ratio of PFC and/or HFC to ozone is from 0.1 to 10, and the humidity prior to reaction is between 20% and 100%.

2. The method as claimed in claim 1, wherein the iron oxide is selected from the group consisting of ferric oxide, ferric oxide monohydrate, ferriferrous oxide, ferriferrous oxide monohydrate and a combination thereof.

3. The method as claimed in claim 1, wherein the PFC is $CF_4$, $C_2F_6$, $C_3F_8$, $NF_3$, $SF_6$, or a combination thereof.

4. The method as claimed in claim 1, wherein the HFC is CHF3.

5. The method as claimed in claim 1, wherein the temperature is between about 100° C. and about 150° C.

6. A method for treating waste gas containing PFC and/or HFC, comprising the steps of:
   (i) heating the waste gas containing PFC and/or HFC in a concentration of from 100 to 50000 ppmv and water in a concentration of from 1 to 1000 ppmv at a temperature between 50° C. and 300° C.;
   (ii) introducing ozone in a concentration of from 100 to 50000 ppmv to the resultants from the step (i) and mixing to form a uniform mixture; and
   (iii) subjecting the mixture of the waste gas containing PFC and/or HFC, ozone, and water and an iron oxide catalyst to gas-solid contact and oxidation reaction at a temperature between 50° C. and 300° C. for 1.0 to 10 seconds retention time to reduce the amount of PFC and/or HFC.

7. The method as claimed in claim 6, wherein the iron oxide is selected from the group consisting of ferric oxide, ferric oxide monohydrate, ferriferrous oxide, ferriferrous oxide monohydrate and a combination thereof.

8. The method as claimed in claim 6, wherein the PFC is $CF_4$, $C_2F_6$, $C_3F_8$, $NF_3$, $SF_6$, or a combination thereof.

9. The method as claimed in claim 6, wherein the HFC is $CHF_3$.

10. The method as claimed in claim 6, wherein the temperature is between 100° C. and 150° C.

11. The method as claimed in claim 6, further comprising the step of:
(iv) removing inorganic acid produced from step (iii) with a scrubbing solution.

12. The method as claimed in claim 6, further comprising, after step (i) or before or after step (iii), the step of:
monitoring and controlling the temperature, the moisture, and the concentration of ozone.

13. The method as claimed in claim 11, further comprising, after step (i) or before or after step (iii), the step of:
monitoring and controlling the temperature, the moisture, and the concentration of ozone.

* * * * *